Jan. 1, 1963     I. B. COOPER, JR     3,071,000
FUEL FLOW MEASURING DEVICE

Filed Oct. 24, 1957     3 Sheets-Sheet 1

INVENTOR.
IRVING B. COOPER JR.
BY
ATTORNEY

Jan. 1, 1963  I. B. COOPER, JR  3,071,000
FUEL FLOW MEASURING DEVICE
Filed Oct. 24, 1957
3 Sheets-Sheet 2

INVENTOR
IRVING B. COOPER JR.
BY
Geo. G. Hyde
ATTORNEY

Jan. 1, 1963 I. B. COOPER, JR 3,071,000
FUEL FLOW MEASURING DEVICE
Filed Oct. 24, 1957 3 Sheets-Sheet 3

INVENTOR.
IRVING B. COOPER JR.
BY
*Geo. G. Hyde*
ATTORNEY

United States Patent Office 3,071,000
Patented Jan. 1, 1963

3,071,000
FUEL FLOW MEASURING DEVICE
Irving B. Cooper, Jr., Davenport, Iowa, assignor to The Bendix Corporation, a corporation of Delaware
Filed Oct. 24, 1957, Ser. No. 692,217
4 Claims. (Cl. 73—194)

This invention relates to fluid flowmeters, and particularly to mass rate flowmeters of the rotary type, which are of particular value where changes in the fluid unit mass are expected. This condition is generally encountered in metering liquid fuel for jet engines, where mass flowmeters especially important, since the calorific value of the fuel is proportional to mass. While the invention is adapted for this use, it includes features applicable to other uses and to other types of fluids, including gases.

Prior rotary mass flowmeters are known which include a power source driving a rotating impeller which imparts circular motion to the fluid, followed by a metering unit operated by the impact of the rotating fluid. An object of the invention is to provide a novel simplified rotary flowmeter that dispenses entirely with this type of metering unit and operates with the impeller alone. This is in general accomplished by utilizing the impeller drive torque in a novel manner to provide the metering action.

Fluid flowmeters are normally connected in pipe lines; and a purpose of the invention is to provide a mass flowmeter suitable for location in a pipe line and which will have the features and advantages herein indicated.

Certain rotary flowmeters produce substantial lateral deviations in the direction of flow of the fluid which tend to dissipate energy and result in a pressure drop. An object of this invention is to provide a rotary mass flowmeter in which the pressure drop is minimized; and a specific object is to reduce the extent of deviation of the fluid flow in the meter from its rectilinear direction of flow.

Another object is to provide a rotary flowmeter construction having an arrangement that will facilitate compact design. One way in which this is accomplished is to construct and arrange the impeller and an associated metering unit so that at least a part of the unit may be located within the impeller.

According to the invention the rotating impeller is associated with a rotating metering mechanism including a rotor, both revolving continuously; and an object of the invention is to provide means for relatively displacing the metering rotor and the impeller, preferably in a circumaxial direction, in proportion to the resistance of the fluid to the rotation of the impeller, which of course corresponds to the impeller torque. A purpose of the invention is to provide an arrangement of this type that is simple, compact and efficient. This is in general accomplished in the preferred embodiment by driving the impeller from the rotor through a drive unit that will yield in proportion to the impeller driving torque, a suitable spring unit having been found to be satisfactory for this purpose. A further object of the invention is to provide an especially compact arrangement of these elements, which is in general accomplished by employing a telescoped arrangement of the impeller rotor and the yieldable drive unit.

In the preferred form an electrical metering signal is generated. A object of the invention is to provide a novel construction and arrangement incorporating in a rotary mass flowmeter an electrical signal generator having two continuously rotating sections, the signal being generated in accordance with the relative position of the sections, and the provision of means for producing relative movement of the sections during simultaneous rotation in accordance with the changes in the mass rate of flow. A specific object is to accomplish this result by providing for rotation of the two generator sections in conformity with the rotation of the impeller and the metering rotor respectively, so that the sections will be offset to an extent corresponding to the offset relationship of the impeller and rotor.

A further object is to facilitate the reduction in size of the unit by providing an arrangement in which at least a part of the electrical signal generator may be located within the impeller.

It is essential that electrical components, and particularly the signal generator and motor, if the latter is located in the fluid stream, shall be adequately protected from the fluid, especially when the latter is liquid fuel. An object of the invention is to provide a sealed housing or compartment for such components which is constructed and arranged to permit the transmission of driving energy through the housing to elements outside of the housing, such as the driving rotor, and the regulation of the position of the sections of the signal generator within the housing by elements outside of such housing, while maintaining the housing in fully sealed condition. This in general is accomplished by utilizing magnetic drive couplings through the housing; and a purpose of the invention is to provide a novel, compact, and efficient construction and arrangement of coupling magnets and associated elements for this purpose.

In order to be certain that substantially the entire fluid flow is metered, it must pass between the blades of the impeller, which consequently must extend substantially to an inner wall of a cylindrical housing surrounding the impeller. However, the frictional resistance of this wall to the fluid flow will reduce the rate of flow along the wall for a substantial radial distance, which will affect the accuracy of the meter. An object of the invention is to eliminate this condition, and in general is accomplished by employing a cylindrical shield or baffle between the rotor and casing wall, and rotating the shield at a rate at which no effective frictional drag is exerted on the impeller. A specific object of the invention is to simplify the meter construction by arranging the rotary baffle as an element of the drive rotor.

For maximum metering accuracy it is important that the impeller shall be sensitive in its reaction to very slight changes in the unit mass of the fluid. Since the impeller must revolve at a substantial rate, an appreciable amount of friction in the impeller bearings is inevitable when it is mounted on stationary elements in the usual manner. An object of the invention is to improve materially the sensitiveness and accuracy of the meter by substantially eliminating the frictional resistance to impeller adjustment in position due to changes in the mass rate of flow. This is in general accomplished by providing a rotating support driven at substantially the same rate of rotation as the impeller, and mounting the impeller in bearings on such support so that there will be no rotation in the bearing under operating conditions except when the mass rate of flow of the fluid changes, in which case the extent of such rotation will be very slight and relatively slow. This arrangement furthermore makes it possible to employ very light bearings having substantially less frictional resistance to rotation than the bearings that would be required if the impeller rotated in its bearings at the same rate as the drive rotor.

A further purpose of the invention is to provide a bearing arrangement of this type that will be compact. A related purpose is to utilize the baffle in providing the indicated bearing arrangement. Another purpose is to provide a bearing arrangement of the indicated type designed and arranged within the impeller so that other elements of the meter construction may be telescoped within the impeller. A specific object is to provide a portion of the drive rotor extending within the impeller and providing a bearing support for the impeller, said portion being hollow and arranged to receive other portions of the meter mechanism within the impeller.

Rotary metering units of the type indicated are adapted to generate an electrical signal which may be transmitted to an indicator located at a distance, and consequently are ordinarily referred to as transmitters. The indicator is adapted to show the mass rate of flow. However, where several mass rate flowmeters are in operation in the same installation, as in multi-engine aircraft provided with a mass rate flowmeter transmitter for each engine, an indicator system may be provided which includes an indicator showing the total mass rate of flow of fuel to all engines. It likewise may include an arrangement known as a totalizer in which the mass of fuel which has flowed past all of the transmitters is registered on a tachometer or counter. An object of the invention is to provide a mass rate flowmeter transmitter that will generate a signal suitable for the operation of an indicator system employing any or all of the instrumentalities described.

Another object of the invention is to provide a mass flow metering system that will be operative on fluid flow in either direction. This arrangement is especially useful where a storage container from which the fluid normally flows is refilled through the metered passage. It is of outstanding value in aircraft, since it facilitates the metering of the fuel supplied during refueling, particularly when the latter takes place in the air.

An object of the invention is to provide a novel mass flow rate meter that will register the mass rate of flow in either direction without alteration or adjustment.

A related object is to provide a metering arrangement in which the totalizing counter is reversed when the direction of flow through the meter is reversed, a specific object being to accomplish this result by automatic means. When the counter is set to indicate the amount of fluid that has passed through the meter, its reversal will reduce the counter reading; and if the counter was set at zero when the storage or supply container was full, the counter can then be used to indicate the extent to which the container is filled. If the counter is set to show the amount of fluid remaining in the supply container, its reversal will increase the reading as the container is filled, likewise showing the degree of such filling. When the direction of flow is again reversed to withdraw fluid from the container, the operation of the counter will again be reversed and it will function in its normal manner with either type of setting.

A further purpose of the invention is to provide an improved indicating circuit that will function under flow reversal conditions in the manner set forth, and specifically a circuit adapted and arranged for improved actuation of the totalizing elements under such conditions.

Other objects and advantages will appear from the following description of a preferred embodiment of the invention, considered in conjunction with the accompanying drawings, in which FIG. 1 is a partially diagrammatic longitudinal central section of a meter transmitter embodying the invention;

Figure 1:
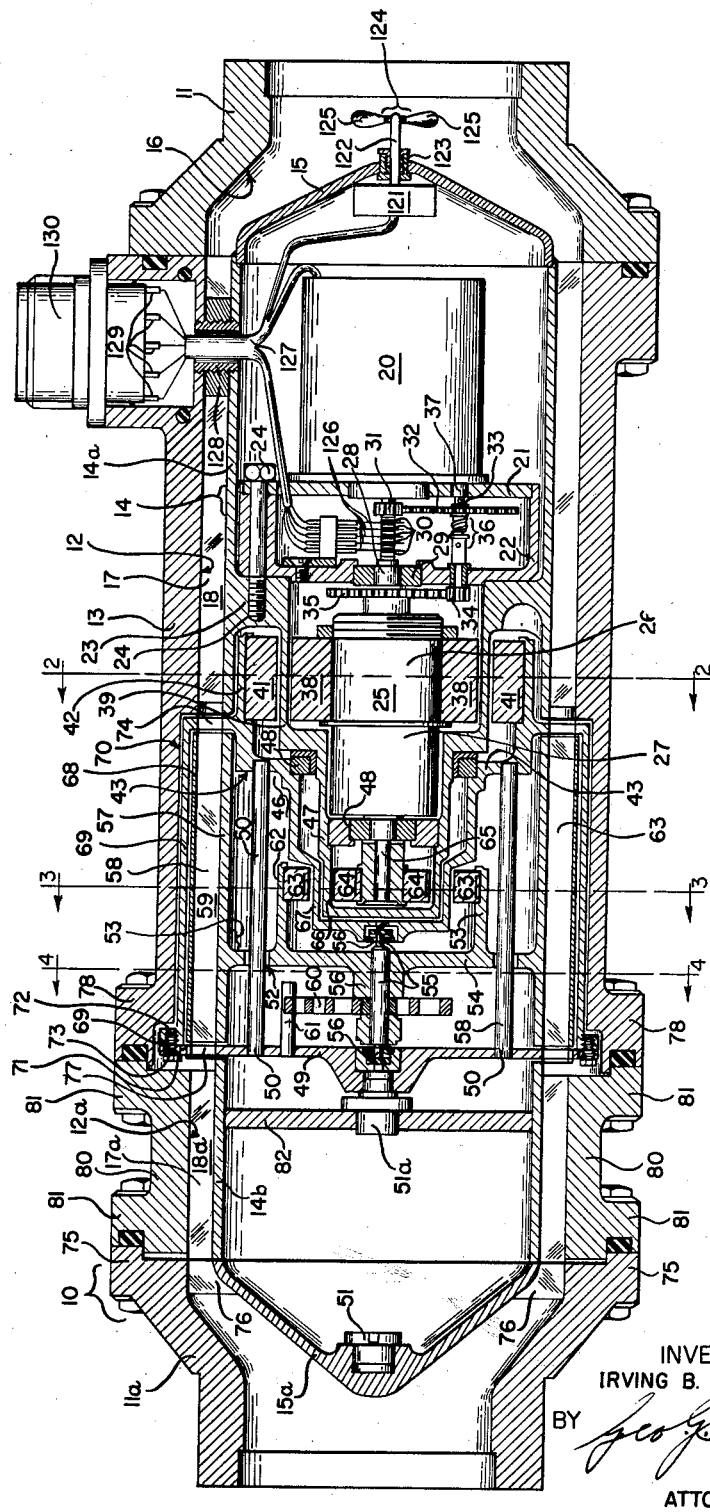
Figure 2:
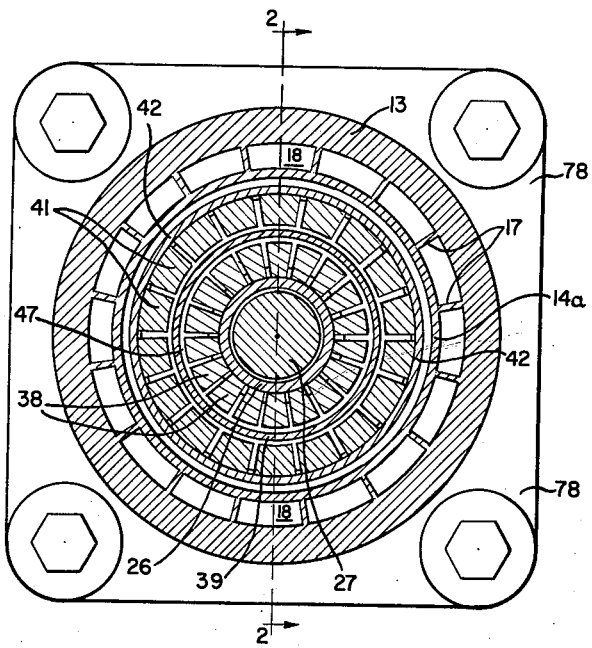
FIG. 2 is a transverse section on line 2—2 of FIG. 1.
Figure 3:
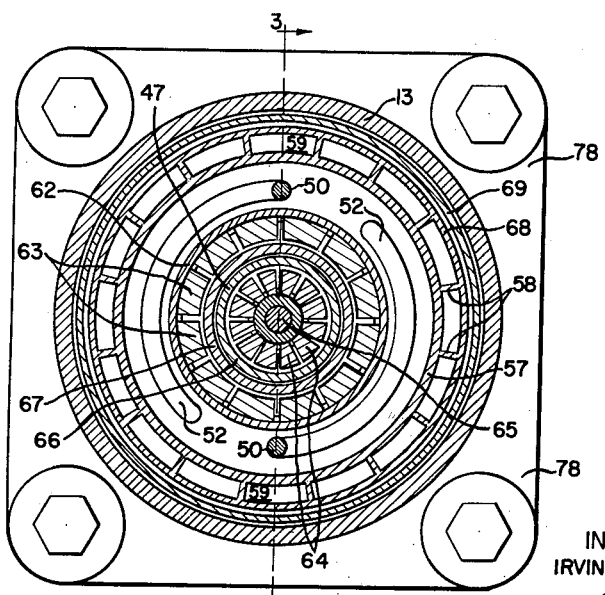
FIG. 3 is a transverse section on line 3—3 of FIG. 1.
Figure 4:
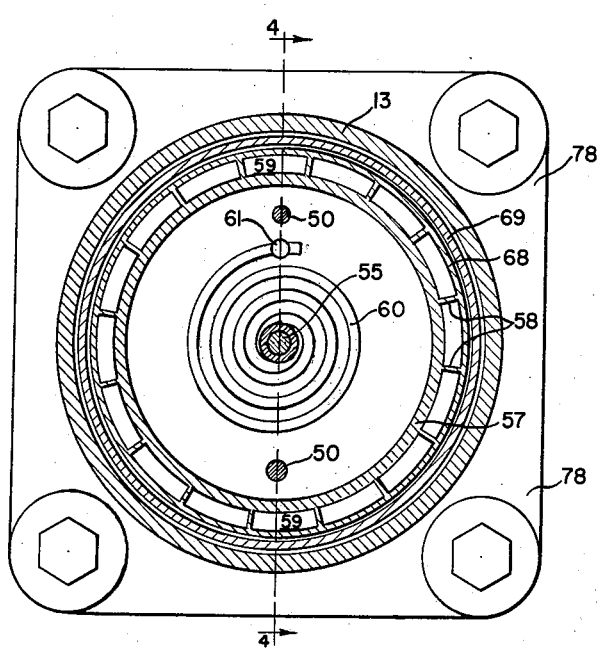
FIG. 4 is a transverse section on line 4—4 of FIG. 1.

The meter transmitter is shown as enclosed in cylindrical casing 10 having reduced end sections 11, 11a arranged for coupling to the fluid piping. An annular fluid passage extending along the cylindrical inner wall 12 of central casing section 13 and the registering inner walls of end sections 11, 11a is formed by an arrangement including an inner casing 14 having a cylindrical central section 14a concentric with wall 12 of section 13 of the outer casing, and a streamlined closed end section 15 forming a continuation of section 14a and advantageously sealed thereto as by welding. Inner casing 14 is mounted on casing section 13 by an annular series of radial partitions or vanes 17 extending parallel to the axis of the casing. The inner and outer casings are arranged to form an annular fluid passage having the same cross-section throughout, assuring a minimum of interference with the flow of fluid, and divided in its central section into a plurality of longitudinal channels 18 parallel to the axis, the portion of the passage connecting with the pipe line forming a streamlined tapering connecting passage.

Drive means is provided extending into the inner casing. In the form illustrated a constant speed drive motor 20 is suitably mounted therein, as by attaching the motor to a mounting plate 21 extending across a cup-shaped inner housing 22, the plate and housing being fixed to an inwardly extending flange 23 of the inner casing section 14 as by bolts 24.

A suitable electrical signal generator is mounted in the inner casing 14 and actuated by the drive means. The generator 25 comprises two relatively rotatable sections 26 and 27 connected internally by a bearing (not shown). Generator 25 may be either a synchro or a potentiometer, the external construction and mechanical operation of these two types being the same.

Generator section 26 is provided with a pivot shaft 28 rotatably mounted in bearing 29 in the housing 22, and has a portion extending into the housing, provided with a plurality of slip rings 30 connected to the circuits in sections 26 and 27 in known manner. As shown, section 26 is driven from motor 20 through suitable speed reduction gearing, illustrated as including a pinion 31 on the motor shaft meshing with gear 32 on shaft 33 driving pinion 34 meshing with gear 35 on pivot shaft 28 of generator section 26. Gear 32 may be connected to shaft 33 through a friction clutch 36 as shown, preventing injury to the drive arrangement in case of any obstruction to the rotation of section 26.

Inner casing 14 is advantageously arranged to surround the generator 25 and to form a sealed enclosure for the electrical system. A drive arrangement is provided for transmitting driving energy through casing 14 to a drive rotor 43. In the form illustrated an annular series of magnets 38 mounted on generator section 26 and extending along and close to a thin cylindrical wall 39 of casing 14 is magnetically coupled to an annular series of magnets 41 radially aligned with magnets 38 and mounted for rotation close to wall 39 on flange 42 of drive rotor 43.

Drive rotor 43 is suitably constructed and arranged to drive an impeller through a yielding coupling as already indicated. It is advantageously constructed with spaced but connected end sections. In the form shown it includes an inner end section 46 which extends toward and around the inner end of the signal generating unit, and is rotatably mounted on a similarly shaped section 47 of inner casing section 14 as by means of a suitable bearing 48. The other end section of the rotor as shown is a plate 49 suitably fixed to end section 46 as by means of two axial mounting rods 50 at opposite sides of the axis of rotation. End plate 49 is pivotally supported for rotation in a bearing 51a.

A rotary impeller 53 is mounted in casing 10, and is driven by rotor 43 through a yielding connection, being provided with peripheral fluid channels 59 in alignment with the channels 18 between partitions 17. Impeller 53 is advantageously mounted on rotor 43, and the form shown includes a transverse supporting impeller wall 54 carrying an axial shaft 55 journaled in bearings 56 in the end sections 46 and 49 of drive rotor 43, wall 54 being provided with concentric slots 52 through which mounting rods 50 pass. Slots 52 are advantageously as long as is feasible, a length of 140° having been found to be practical. A cylindrical impeller wall 57 is mounted on supporting wall 54 in accurate axial alignment with casing section 14a, and is provided with radially extending impeller vanes or blades 58, which advantageously are parallel to the axis of rotation and whose outer margins are in alignment with the inner wall 12 of casing 13, defining impeller passages 59.

Impeller 53 is connected to rotor 43 by a drive connection which will yield substantially linearly in accordance with the resistance of fluid to rotation of the impeller 53, such resistance representing the driving toque of the impeller. The yielding connection is advantageously in the form of a spring. In the illustrated embodiment of a spiral spring 60 having linear characteristics is mounted at its outer end on rotor end plate 49, as by fixing it to mounting stud 61, and at its inner end is fixed to the impeller shaft 55.

An arrangement is provided for maintaining section 27 of the signal generator in radial alignment with impeller 53. Where the generator is enclosed, as in the form illustrated, this is advantageously accomplished by utilizing a magnetic drive. In the arrangement shown, an annular bracket 62 on supporting wall 54 of the impeller 53 carries an annular series of magnets 63 in radial alignment with a similar series of magnets 64 mounted on shaft 65 of generator section 27. The radially aligned cylindrical portions 66 and 67 of inner casing section 14 and rotor end wall 46 respectively are relatively thin, with minimum practical clearance between the walls and the magnets, arranged to provide adequate coupling through the walls between magnets 63 and magnets 64.

It has been found advantageous to provide a thin enclosing cylinder 68 extending around and mounted on the outer margins of impeller blades 58 to provide enclosed passages 59 between the blades. It is also desirable to provide a cylindrical baffle or shield 69 between blades 58 and the inner wall 12 of casing section 13 to eliminate the viscous drag on the blades or cylinder 68 which would otherwise be produced. Cylinder 68 and shield 69 are located in a recess 70 in the inner wall 12 of casing section 13 so that the channels 59 between blades 58 will be in precise longitudinal alignment with the channels 18 between vanes 17.

A suitable arrangement is provided for mounting the shield 69 on rotor 43. In the form illustrated, at least one of the end sections of the rotor extends across the fluid passage and is fixed to shield 69, the portion of the end section in axial alignment with the passage being formed of thin radial vanes in alignment with the axis of rotation, arranged to offer minimum resistance to the fluid. In the form illustrated, rotor end plate 49 is provided with such vanes 77, which may be integral, connected to a mounting flange 71 detachably connected to mounting flange 72 on shield 69, as by screws 73. In the specific example illustrated, similar vanes 74 on rotor end section 46 are fixed to the other end of shield 69.

It is noted that in the arrangement described, the end sections 46 and 49 of drive rotor 43 are connected both by the mounting rods 50 and by the connections through vanes 77, 74 to shield 69. While this provides a particularly strong arrangement, it is not essential that both types of connection should be employed. When rods 50 are used, it is not essential that the shield 69 shall be supported at both ends; and where the main flow through the fluid passage is from one end, which normally is the end connected to the main fluid supply container, there is an advantage in dispensing with vanes at the inlet end of the impeller 53, thereby elimnating any rotary impelling action that the vanes may have on the fluid.

When the metering of fluid flow from one end of the meter transmitter, in the present example the left end, is unimportant, the casing section 11a at that end may be arranged for direct connection to casing section 13, being provided with marginal bolting flanges 75 for that purpose. A streamlined inner casing end section 15a similar to the end section 15 is located in casing section 11a and is mounted on the latter section, as by thin radial mounting vanes 76 extending parallel to the axis. End section 15a may carry a bearing 51 for the end plate 49 when flanges 75 are bolted to registering flanges 78 on casing section 13.

However, the meter transmitter is advantageously constructed so that it can provide longitudinal turbulence-eliminating passages at this end of impeller 53 also, which are of value when flow through the impeller 53 from the left end is important. This arrangement can be provided by employing a detachable outer casing section 80 having bolting flanges 81 registering with flanges 75 and 78 with an inner wall 12a connected by thin radial vanes 17a, corresponding to vanes 17, to an inner casing section 14b forming fluid passages 18a in register with passages 59 and 18. Section 14b carries a suitable mounting for bearing 51a for plate 49, such as transverse wall 82. The indicated elements carried by outer casing section 80 are in alignment with corresponding elements of outer casing sections 11a and 13, providing a continuous uniform annular passage connecting the ends of the meter transmitter through the impeller 53.

Figure 5:
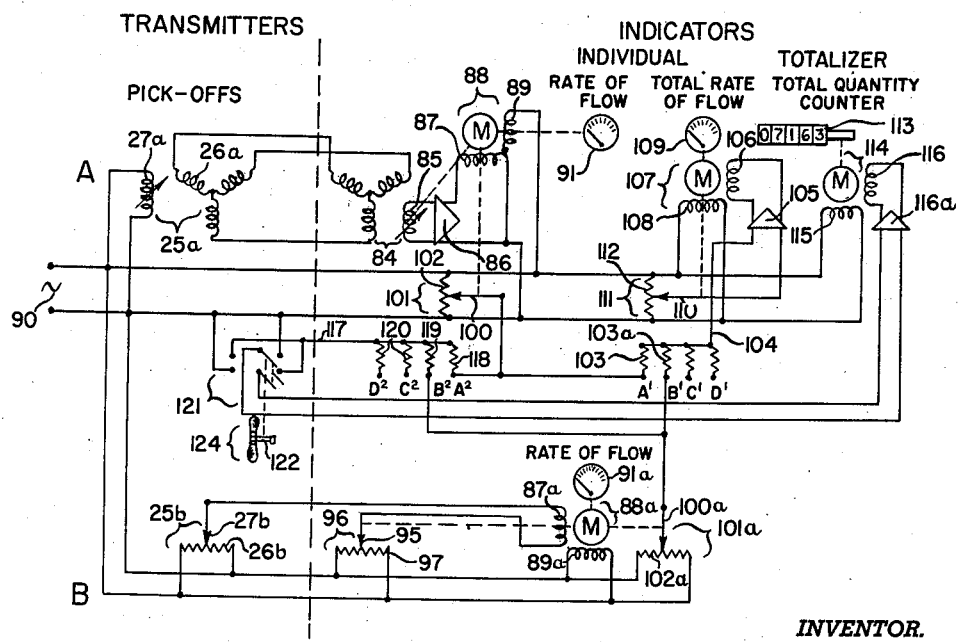
FIG. 5 is a diagram of an electrical circuit including transmitters, indicators and totalizers.

An electrical circuit suitable for use with the transmitting meter unit shown in FIG. 1 is illustrated in FIG. 5, which includes transmitting circuits for two transmitters and an indicating circuit comprising a rate of flow indicator for each transmitter, together with a totalizing unit including an indicator of the total rate of flow and a counter showing the total quantity metered. In the upper transmitter circuit A the signal generating unit is a synchro 25a, sections 26 and 27 of the unit below the stator 26a and rotor 27a respectively. This transmitter synchro is coupled back to back to an indicator synchro 84 whose rotor 85 is coupled through an amplifier 86 to a field winding 87 of a reversible motor 88, the other field winding 89 of which is connected across a source 90 of alternating current. The motor has a driving connection to rotor 85 and to a rate of flow meter 91.

The operation of the system thus far described will now be set forth. Fluid flowing into the transmitter from the right will be deflected outwardly by casing section 15 and into passages 18, where any turbulence will be eliminated and uniform flow parallel to the axis will be assured. Fluid from passages 18 will flow through the annular opening in the adjacent end section 46 of drive rotor 43 and into passages 59 between impeller blades 58, which will impart rotary motion to the fluid. The resistance of the fluid to the force exerted by blades 58 will be proportional to the rate of flow of the fluid and the mass of the fluid. This resistance to rotation will turn the impeller 53 relative to the drive rotor 43 on which it is mounted, slots 52 permitting free movement past rods 50, spring 60 being compressed until the increasing resistance of the spring just balances the fluid resistance to impeller rotation, which of course will represent the torque necessary to drive the impeller 53 from drive rotor 43.

Section 26 of the signal generator unit 25 will be driven at a fixed speed by motor 20, and drive rotor 43 will be driven at the same speed through magnet series 38 and 41. Section 27 of the signal unit will be maintained in alignment with the deflected impeller 53 through the coupling of magnet series 63 and 64, so that the position of section 27 will shift circumferentially with respect to section 26 to precisely the same extent as impeller 53 is shifted with reference to drive rotor 43 by the resistance of the fluid. When unit 25 is a synchro, as in the upper transmitter circuit A of FIG. 5, this will move the rotor 27a of transmitter synchro 25a from neutral to the indicated extent, creating a voltage in the rotor 85 of indicator synchro 84 which after amplification will be applied to the field winding 87 of motor 88, causing the motor to turn rotor 85 in the proper direction until it reaches a neutral position, at which time no voltage will be applied to winding 87 and the motor will stop. The indicator 91 will be actuated by motor 88 to the same extent, and is calibrated to show the correct mass rate of flow. If said mass rate should change, the impeller 53 will be similarly shifted with relation to drive rotor 43, section 27 will shift relative to section 26 to generate a signal, and motor 88 will adjust indicator 91 in similar manner to indicate the changed rate of mass flow.

The lower circuit B in FIG. 5, which includes a second transmitter identical in arrangement with that already described, operates in the same manner, the only difference being that the signal generating unit 25 comprises a potentiometer 25b section 26 being the resistance element 26b connected across source 90 while section 27 is the contact element or brush 27b. Brush 27b is connected to brush 95 of an indicator potentiometer 96 whose resistor element 97 is connected across source 90 so that for similar positions of brushes 27b and 95 the output voltages of the two potentiometers will be equal. The two brushes are connected to field winding 87a of reversible indicator motor 88a, whose other field winding 89a is connected across the source 90. Motor 88a is mechanically connected to both brush 95 and rate of flow indicator 91a, and is arranged to shift brush 95 to the point where its voltage balances that from brush 27b, at which time the motor 88a will stop with indicator 91a in proper position to show the rate of mass flow.

A totalizer circuit is also illustrated in FIG. 5, in which signals from any number of transmitters can be totalized. It is shown with the two illustrated metering circuits A and B connected to the totalizer input circuit terminals A' and B', with terminals C' and D' provided for connecting two other metering circuits to the totalizer, an arrangement that is applicable for instance to the fuel supply system. For a four engine aircraft having a metering circuit A connected to terminal A', the motor 88 is mechanically coupled to brush 100 of a potentiometer 101 whose resistor 102 is connected across the source 90. In the circuit B connected to terminal B' motor 88a is mechanically coupled to brush 100a of potentiometer 101a whose resistor 102a is connected across said source. With this arrangement a continuous voltage is generated for each meter system which corresponds to the mass rate of flow in the system. Brush 100 is connected through terminal A' and voltage dropping resistor 103 to totalizer rate lead 104. Brush 100a is similarly connected through terminal B' and resistor 103a to lead 104. Other individual metering systems may be similarly connected to lead 104 through terminals C' and D' and their series resistors. With this arrangement a continuous voltage is applied to lead 104 which corresponds to the total rate of mass flow in all of the connected metering systems.

Lead 104 is connected to the input of an amplifier 105 whose output is applied to field winding 106 of reversible constant speed motor 107, the other field winding 108 being connected across source 90. This motor is mechanically coupled to total rate of flow indicator 109 and to brush 110 of a potentiometer 111 whose resistor 112 is connected across source 90. The connections are arranged so that the voltage from potentiometer 111 will be in opposition to the phase of the voltage from lead 104 which is connected to the input of amplifier 105, and brush 110 will be shifted until the two voltages are balanced and no voltage will appear across field winding 106. In this position the indicator 109 will show the total mass rate of flow in all of the metering systems connected to the totalizing system.

This totalizing system is shown as including also a tachometer or counter 113 for indicating the quantity of fluid passing any number of metering transmitters. This counter is operated by a variable speed reversible motor 114 having a field winding 115 connected across source 90 and a speed-regulating field winding 116 connected through amplifier 116a at one side to a counter lead 117 and at the other side to the proper side of source 90 to complete the circuit through the winding. Lead 117 is connected through voltage dropping resistor 118 and terminal A² to brush 100 of potentiometer 101, and similarly through resistor 119 and terminal B² to brush 100a of potentiometer 101a. Other metering system output signals can likewise be connected to lead 117 through terminals C² and D² and resistors 120. With this arrangement the speed or rotation of motor 114 will be proportional to the sum of the voltages from the various metering systems, so that counter 113 will be operated to record the total quantity of fluid flowing through the connected metering systems.

An arrangement is provided for reversing the polarity of winding 116 and thereby reversing the direction of rotation of motor 114 when the direction of flow is reversed. In the form illustrated, this comprises a reversing switch 121 connected across counter lead 117 and one side of the source 90 respectively arranged to reverse the connections to the speed regulating field winding 116 of totalizer motor 114. While this switch can be operated in any desired manner, an arrangement is shown whereby it may be operated automatically by fluid flow when the direction of flow is reversed. In the embodiment illustrated in FIG. 1, switch 121 is mounted in end section 15 of inner casing 14 and is connected by a rod 122 passing through stuffing box 123 to a switch actuating element that is moved in one direction by flow of current in a certain direction, and is moved in the opposite direction when the current flow is reversed. In the form shown this element 124 is of the propeller type, with oppositely angled blades 125 mounted at opposite sides of rod 122, switch 121 being of the well-known DPDT type operated by rotation of rod 122.

A suitable arrangement is provided for connecting the electrical elements in casing 10, surrounded by the fluid stream, to external contacts. In the form illustrated the brushes 126 engaging slip rings 30, which may provide connections either to a pick-off synchro 25a or to a pick-off potentiometer 25b, are combined with the leads from motor 20 and those from switch 121 in a cable 127 passing through a streamlined pillar 128 to terminals 129 of connector 130 mounted on the outside of outer casing section 13.

While a preferred embodiment of the invention has been shown and described in detail, this has been done by way of illustration and not limitation, since this embodiment and various parts thereof can be modified without departing from the invention.

I claim:
1. A mass flowmeter for measuring the mass rate of flow of a fluid stream, comprising a casing defining a passage for said stream, drive means, means for imparting rotary motion to the stream including an impeller in said passage having a peripheral cylindrical fluid-impelling section and a hollowed interior, a rotor having a first end portion extending into the interior of the cylindrical section at one end of the impeller and a second end portion located at the opposite end of the impeller, and an electrical signal generator having two sections and extending into the interior of said cylindrical section, a sealed housing surrounding said drive means and signal generator, a drive connection between the drive means and the first section of said signal generator, magnetic drive means coupling said first section and the adjacent end section of the rotor through said housing, a drive connection between the other end section of the rotor and the impeller located within the cylindrical section of the impeller and yieldable in accordance with the resistance of the fluid to rotation of the impeller, and a magnetic drive within said cylindrical section coupling the impeller with the second section of the generator through said housing.

2. A mass flowmeter for measuring the mass rate of flow of a fluid stream comprising a casing defining a flow passage in the passage for imparting only rotary motion to the stream without acceleration in the direction of flow including a continuously rotating hollowed fluid impeller having peripheral fluid impelling blades extending longitudinally of the passage and adjacent to the passage wall, stationary flow straightening means in the passage for directing flow parallel to the impeller axis and in a straight path to said impeller, a continuously rotating decoupling shield surrounding the blades and interposed between both the straightening means and impeller and the casing, a driver coupled to rotate said shield, an elastic coupling interconnecting the shield and impeller and disposed within the hollow of said impeller, and means for sensing the relative displacement of said impeller and said driver.

3. A mass flowmeter for measuring the mass rate of flow of a fluid stream comprising a casing defining a flow passage, means located in the passage for imparting rotary motion to the stream including a continuously rotating fluid impeller having peripheral fluid impelling blades extending longitudinally of the passage and adjacent to the passage wall, a decoupling shield surrounding the blades and interposed between the blades and passage wall, stationary flow straightening means in the passage at each end of said impeller capable of directing straightened flow into said impeller from either direction, said shield further including perforated ends interposed between said flow straightening means and the impeller ends, a driver directly connected to said shield and elastically coupled to said impeller, means sensitive to relative angular displacement of said driver and impeller and producing a metering signal corresponding to the mass flow rate of the stream, indicating means actuated by said signal and arranged to provide cumulative indication of the quantity in terms of mass of fluid in said stream passing said impeller, and switch means in said passage sensitive to flow direction, said switch means reversing the indicating means when the direction of the stream through said impeller is reversed.

4. A mass flowmeter for measuring the mass rate of flow of a fluid stream comprising a casing forming a cylindrical passage, means located in the passage for imparting only rotary motion to the stream without acceleration in the direction of flow including a cylindrical fluid impeller having radially formed peripheral fluid impelling blades extending longitudinally of the passage adjacent the passage wall and rotatable about the passage axis, fluid flow straightening means disposed in said casing upstream from said impeller, a rotatable thin fluid decoupling shield surrounding the blades intermediate the impeller and casing wall and further comprising a perforated wall disposed between the straightening means and the impeller, means for rotating the impeller and shield simultaneously comprising a driver having direct connection to the shield and elastic coupling to the impeller, and means for measuring the relative displacement of the impeller and driver.

References Cited in the file of this patent

UNITED STATES PATENTS

| | | |
|---|---|---|
| 2,031,852 | Poillot | Feb. 25, 1936 |
| 2,593,285 | Fay et al. | Apr. 15, 1952 |
| 2,602,330 | Kollsman | July 8, 1952 |
| 2,611,268 | Mellen | Sept. 23, 1952 |
| 2,660,886 | Milmore | Dec. 1, 1953 |
| 2,713,261 | Butterworth et al. | July 19, 1955 |
| 2,720,783 | Leone | Oct. 18, 1955 |
| 2,721,478 | Somerville | Oct. 25, 1955 |
| 2,832,218 | White | Apr. 29, 1958 |
| 2,857,761 | Bodge | Oct. 28, 1958 |
| 2,861,452 | Morgan | Nov. 25, 1958 |
| 2,877,649 | Powers | Mar. 17, 1959 |
| 2,914,944 | Ballard | Dec. 1, 1959 |
| 2,975,634 | Rose | Mar. 21, 1961 |

FOREIGN PATENTS

| | | |
|---|---|---|
| 925,622 | Germany | Mar. 24, 1955 |
| 740,037 | Great Britain | Nov. 9, 1955 |
| 1,131,505 | France | Oct. 22, 1956 |